A. B. FAIRBANKS AND O. C. HANEL.
ANIMAL TRAP.
APPLICATION FILED MAY 18, 1920.
1,438,816.
Patented Dec. 12, 1922.
2 SHEETS—SHEET 2.
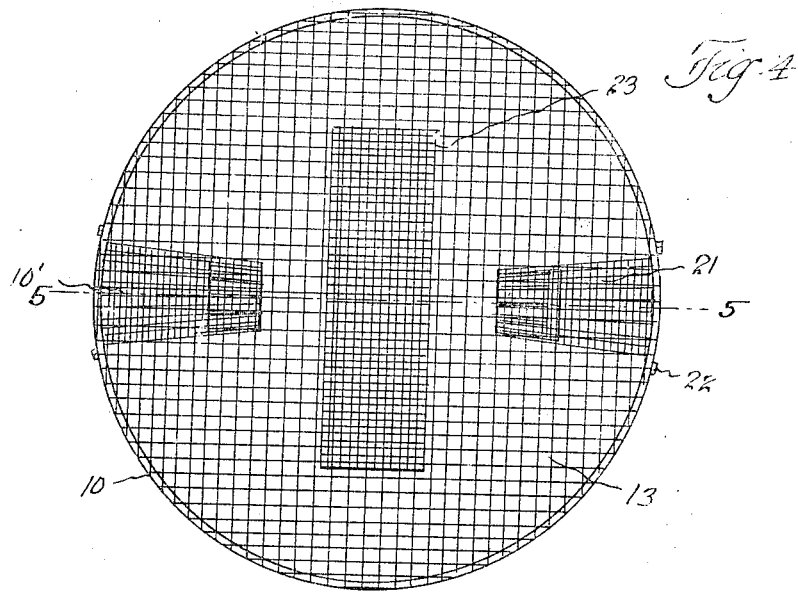
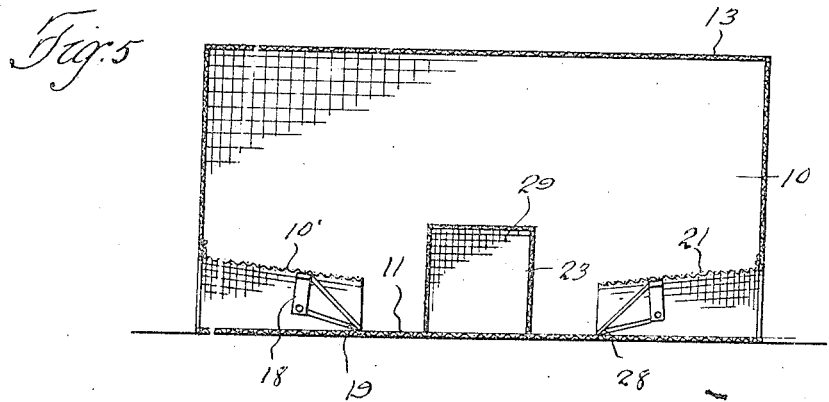
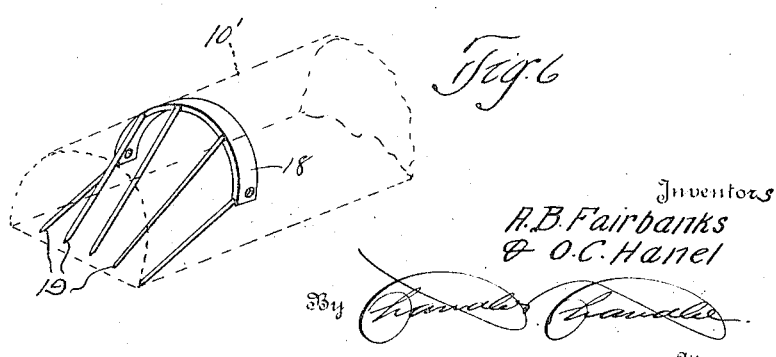
Inventors
A. B. Fairbanks
& O. C. Hanel Patented Dec. 12, 1922.

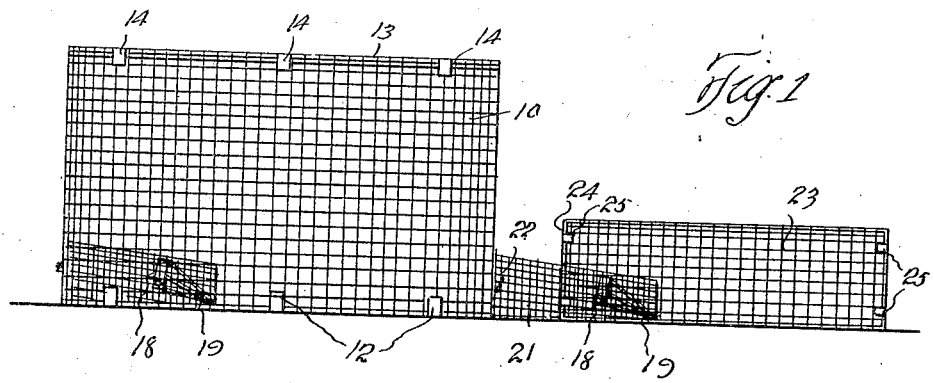
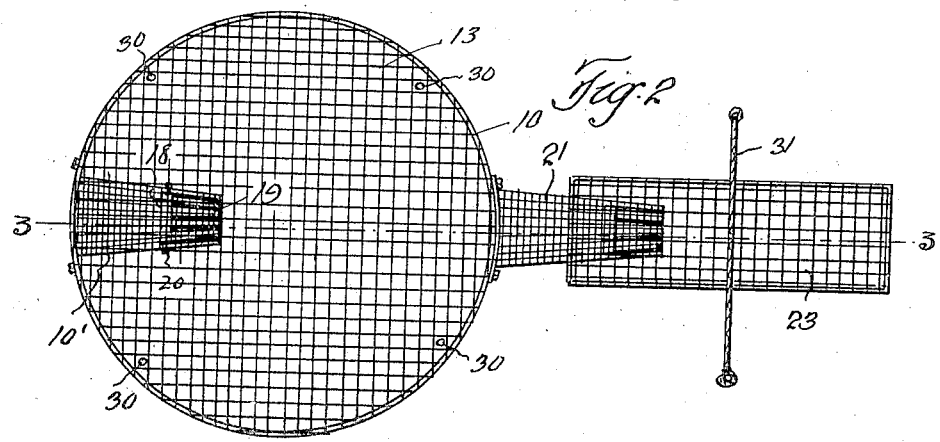
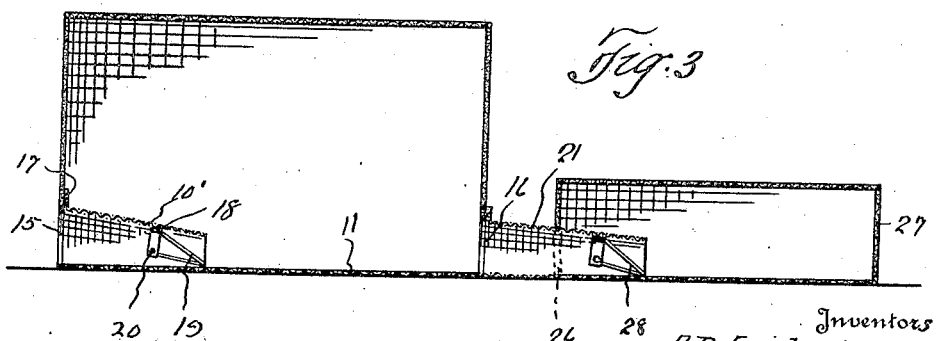

1,438,816

UNITED STATES PATENT OFFICE.

ADELBERT B. FAIRBANKS AND ORA C. HANEL, OF ELK RAPIDS, MICHIGAN.

ANIMAL TRAP.

Application filed May 18, 1920. Serial No. 382,447.

*To all whom it may concern:*

Be it known that we, ADELBERT B. FAIRBANKS and ORA C. HANEL, citizens of the United States, residing at Elk Rapids, in the county of Antrim, State of Michigan, have invented certain new and useful Improvements in Animal Traps; and we do hereby declare the following to be a full, clear, and exact description of the invention, such as will enable others skilled in the art to which it appertains to make and use the same.

This invention relates to new and useful improvements in traps and particularly to traps for catching mice, rats, mink, skunks, birds, and the like.

One object of the present invention is to provide a novel and improved structure of this character wherein an animal enters a main enclosure, from which it cannot escape, and from which the only passage leads to another enclosure in which it will be effectively trapped.

Another object is to provide a novel and improved device of this character wherein when live bait is used to ensnare or attract the animals, the parts are adapted for detachment and reassembly in a different relation.

Other objects and advantages will be apparent from the following description when taken in connection with the accompanying drawings.

In the drawings:

Figure 1 is a side elevation of a trap made in accordance with the invention.

Figure 2 is a top plan view of the same.

Figure 3 is a vertical longitudinal central sectional view through the trap, taken on the line 3—3 of Figure 2.

Figure 4 is a top plan view of the trap when used with live bait.

Figure 5 is a vertical longitudinal sectional view through the device of Figure 4, taken on the line 5—5 of Figure 4.

Figure 6 is a fragmentary perspective view of the inner end of one of the entrance cones of the trap.

Referring particularly to the accompanying drawings, 10 represents a main enclosure which is formed of wire fabric or perforated sheet metal, said enclosure having a removable bottom 11, secured to the side walls by the hook and eye fastenings 12, and the top 13, also connected to the side walls by the hook and eye fastenings 14. In diametrically opposite sides of the enclosure, and adjacent the bottom thereof, are the openings 15 and 16. Extending through the opening 15, into the interior of the enclosure 10, is a tapering, semi-conical, wire screen member 10′, the straight sides of which rest on the bottom 11 of the enclosure, while the larger end is provided with a flange 17 secured to the wall of the enclosure, around said opening. Pivotally mounted in the inner, or smaller end of the semi-conical member is a transverse plate 18, on which are secured the forwardly and downwardly extending tines or prongs 19. These prongs are adapted to be raised by the entering animal, as the animal passes through the member 10′, but cannot be raised by the animal to permit return therethrough. This plate 18 is adjustable, vertically, by means of the bolts 20, so that the trap may be made adaptable for animals of different sizes. Extending outwardly from the other opening 16 is a similar semi-conical screen member 21, the larger end being formed with a flange which is secured to the wall, surrounding the opening 16, by means of the bolts 22.

A trapping chamber 23, formed of wire screen, is disposed against the side of the enclosure and opposite the opening 16. The end wall 24, of the chamber 23 is removably secured to the chamber by means of the hooks and eyes 25, said wall extending a suitable distance above the chamber, and at opposite sides thereof, for the purpose of being secured, by means of the bolts 22, to the wall of the enclosure 10, together with the flange of the member 21. This wall 24 is formed with an opening 26 through which the member 21 is inserted, said member being of such length as to extend to a suitable distance into the chamber. The other end of the chamber is provided with a removable door 27, through which the trapped animals are removed from the chamber.

The animal enters the enclosure 10 through the member 10′, after having lifted the prongs at the inner end thereof. Return through the member 10′ is thus prevented by the fall of the prongs. The only way in which the animal can leave the enclosure 10 is through the opening 16, and through the member 21, into the trapping chamber 23. The inner end of the member 21 is provided with the movable and adjustable prongs 28, similar to those of the member 10', whereby escape from the trapping chamber is effectively prevented.

It will of course, be understood that the bait is placed in the trapping chamber.

When live bait is used in the chamber 23, this chamber is placed in the center of the interior of the enclosure 10. The member 21 is disconnected from the wall of the enclosure 10 and the same inserted in the opening 16, with the smaller end within the enclosure, after which the flange of the member is secured to the enclosure wall by the bolts. Then the animals enter either of the openings 15 or 16, into the enclosure 10 in their attempt to reach the live bait in the chamber 23. Of course, after entering the enclosure, they cannot escape, and cannot get the bait, as said bait is securely housed within the chamber 23. An end wall or door 29 is secured to the end of the chamber 23, in place of the apertured one formerly carried thereby, thus closing all entrances to the chamber.

The enclosure 10 may be secured in place by driving pegs 30 through the projecting edges of the bottom, while a wire 31, passed over the chamber 23, when used in the first instance, and the ends secured to stakes driven in the ground, serve the purpose of holding the chamber 23 against displacement. Furthermore, the connections between the chamber 23 and the enclosure, assure that no means of escape will be permitted between the enclosure 10 and the trapping chamber.

What is claimed is:

A trap having greater and lesser cage members of which the former is adapted to enclose the latter, and interchangeable and reversible passage members having gates and registerable for passage therethrough with openings in the walls of the greater cage member, the lesser cage member having an end opening for the reception of one of said passage members, and being provided with a removable closure for use when the lesser member is enclosed in the greater member.

In testimony whereof, we affix our signatures, in the presence of two witnesses.

ADELBERT B. FAIRBANKS.
ORA C. HANEL.

Witnesses:
EDWARD DURKEE,
FRITZ H. SCHULER.